United States Patent [19]
Ballendux

[11] Patent Number: 4,503,727
[45] Date of Patent: Mar. 12, 1985

[54] TRANSMISSION SHIFT MECHANISM
[75] Inventor: Gerardus M. Ballendux, Waukesha, Wis.
[73] Assignee: Allis-Chalmers Corporation, Milwaukee, Wis.
[21] Appl. No.: 430,014
[22] Filed: Sep. 30, 1982
[51] Int. Cl.³ .................. G05G 5/10; G05G 9/00; F16H 37/00; F16H 3/08
[52] U.S. Cl. ........................ 74/477; 74/475; 74/740; 74/363
[58] Field of Search ............ 74/477, 475, 473 R, 74/740, 745, 359, 358, 357, 329, 363; 192/48.7

[56] References Cited
U.S. PATENT DOCUMENTS

| | | | |
|---|---|---|---|
| 1,207,913 | 12/1916 | Hays | 74/477 |
| 1,276,951 | 8/1918 | Oster | 74/329 |
| 1,820,501 | 8/1931 | Schmidt | 74/477 |
| 2,177,952 | 10/1939 | Snow | 74/740 |
| 2,787,919 | 4/1957 | Senkowski et al. | 74/740 |
| 3,552,227 | 1/1971 | Schroeder et al. | 74/477 |
| 3,554,047 | 1/1971 | Stott | 74/740 X |
| 3,747,425 | 7/1973 | MacDonald | 74/477 |
| 4,132,125 | 1/1979 | Janiszewski | 74/477 |
| 4,449,416 | 5/1984 | Huitema | 74/477 X |

Primary Examiner—Allan D. Herrmann
Assistant Examiner—Stephen B. Andrews
Attorney, Agent, or Firm—Arthur L. Nelson

[57] ABSTRACT

A transmission shift mechanism having straight line movement. The shift control operates a single shift rail carrying two shift forks to provide three speeds and a neutral position.

9 Claims, 7 Drawing Figures

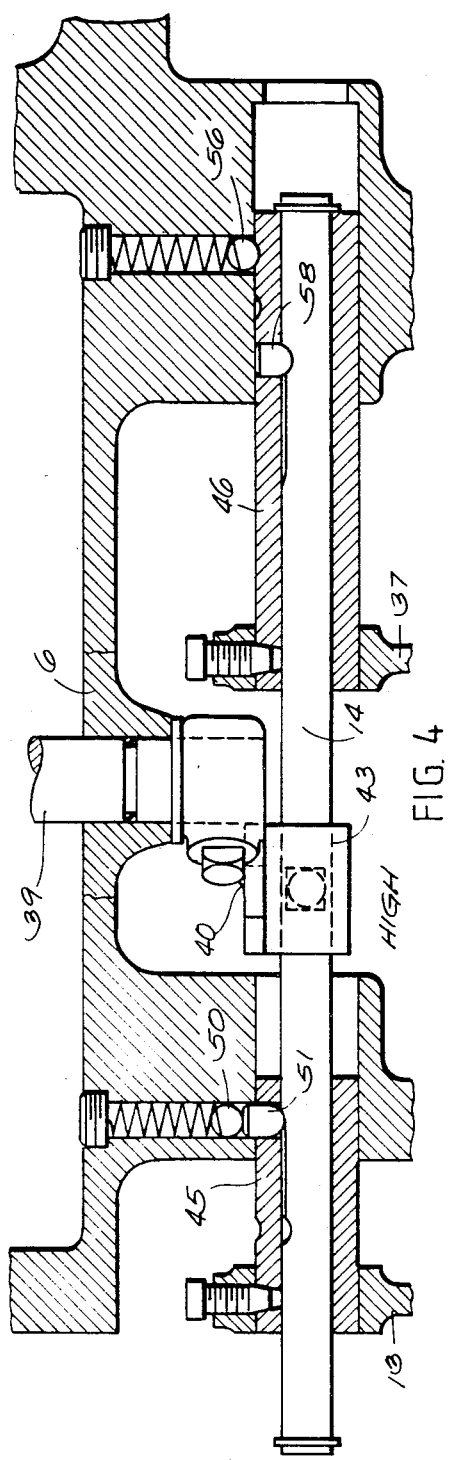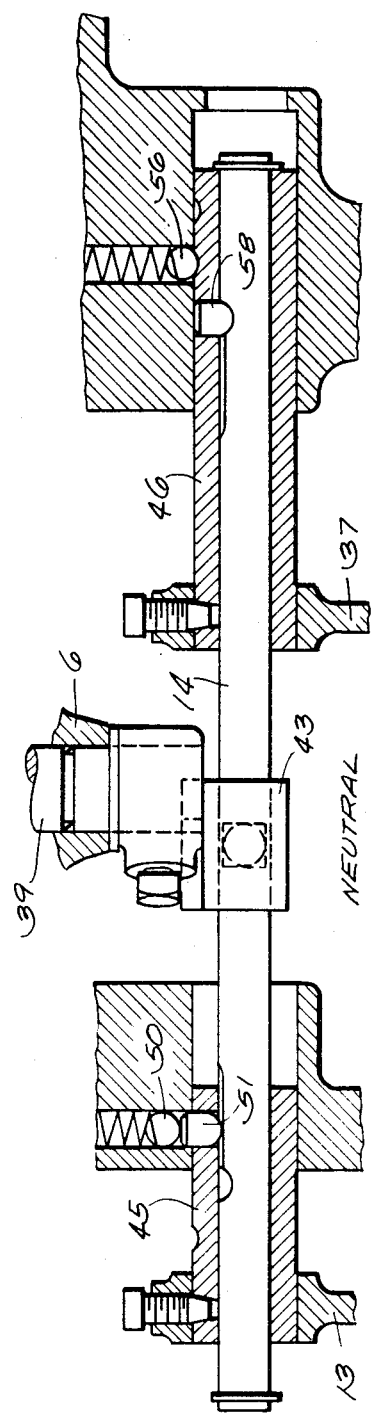

TRANSMISSION SHIFT MECHANISM

This invention relates to a vehicle transmission and, more particularly, to a shift mechanism operated by a shift lever having straight line movement in a common plane for operating a shift rail carrying two shift forks to provide a plurality of gear shift positions and a neutral position.

Manually operated vehicle transmissions are generally shifted through shift rails to select a desired gear ratio. Conventionally, an "H" pattern is used to select one of the shift rails and then reciprocate the shift rail for a movement to selectively shift to the gear ratio. While the "H" pattern is satisfactory for most manually shifted transmissions, there are some advantages to a straight line shift pattern. It is usually more convenient to shift in a straight line pattern and it conserves space on the control console and can avoid confusion for an operator not too familiar with operation of the vehicle.

U.S. Pat. No. 3,747,425, McDonald, illustrates a transfer case with a straight line shifter. Two shift rails, each with a shift fork, are selectively engaged by the control mechanism to operate a drive for a two-wheel and four-wheel drive operation of the vehicle. The applicant, however, provides operation of the control lever in a straight line movement to reciprocate a single shift rail carrying two shift forks to provide three speed gear shift, including a neutral in a range transmission. The shift forks selectively move with the shift rail responsive to a detent and interlock mechanism on each of the shift rails for selectively engaging and disengaging the shift rail as it is moved through its cycle. The rail moves responsive to the shift lever and manually shifts the range of transmission.

It is an object of this invention to provide a shifter having a linear movement to provide three-speed output of the transmission.

It is another object of this invention to provide a control having linear movement of the shifter operating two shift forks to selectively provide three gear shift positions and a neutral position for the transmission.

It is a further object of this invention to provide a linear moving control mechanism to selectively engage a clutch collar on the output of the main transmission and a clutch collar having two positions in the range transmission to selectively provide three forward speeds and a neutral position for the shifter mechanism.

The objects of this invention are accomplished with a lever operating a single shift rail carrying two shift forks for selectively shifting two clutch collars to provide three gear speed positions and a neutral. The output of the main transmission carries a clutch collar to selectively provide direct drive or planetary drive to the range transmission. The range transmission has selective positioning of a clutch collar for a two-speed drive through the range transmission. A detent and interlock mechanism on each of the forks selectively provides movement of the fork as the control lever is moved through a sequence of four positions to provide the three gear speeds and neutral for the shift mechanism.

Referring to the drawings, a preferred embodiment of this invention is illustrated:

FIG. 4 is a cross-section view showing the shifting mechanism in the high speed position;

FIG. 5 is a cross-section view of the shifting mechanism in the neutral position;

Figure 1:
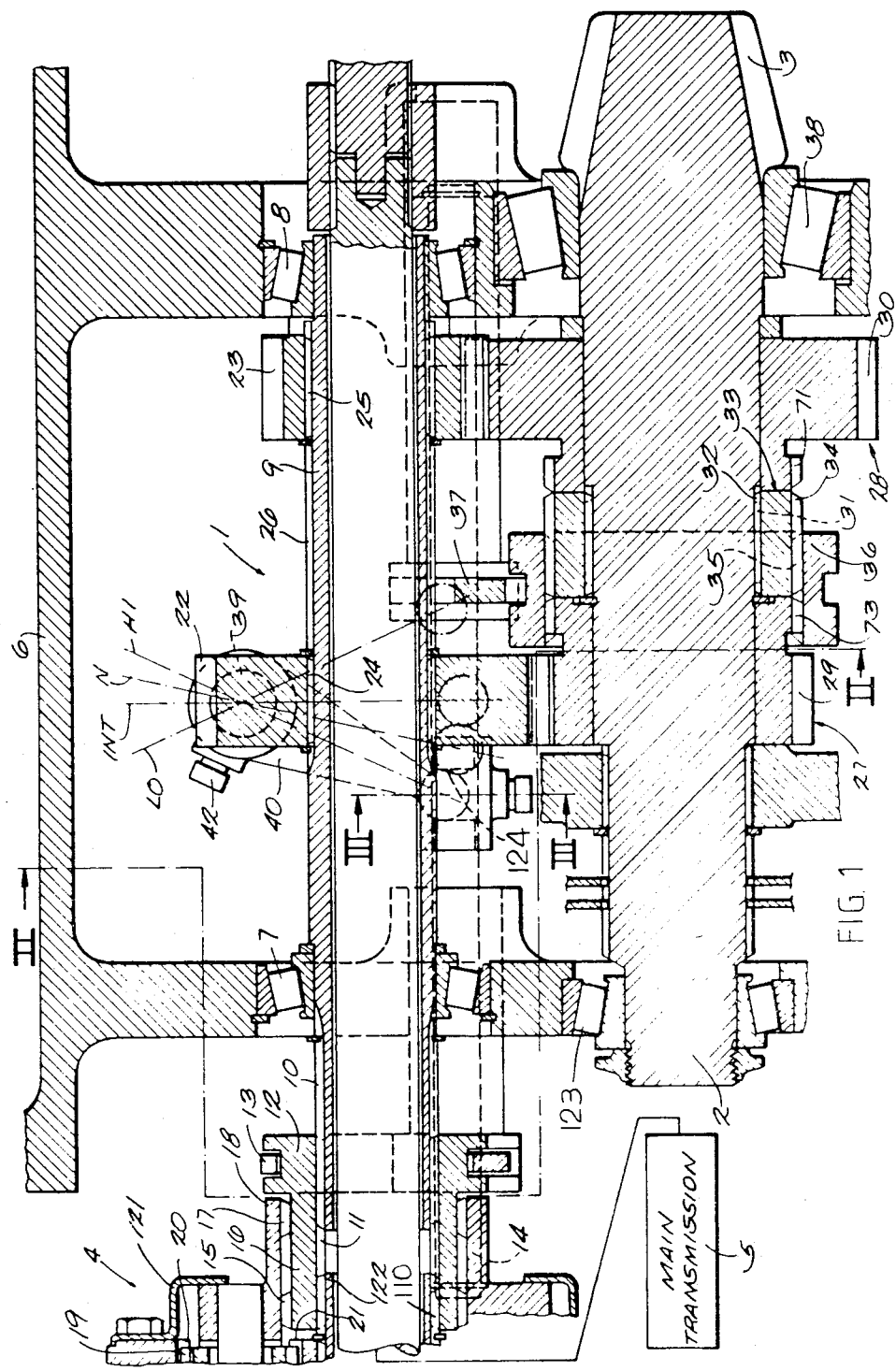
FIG. 1 illustrates the output of the main transmission and the range transmission with the shifting mechanism.
Figure 2:
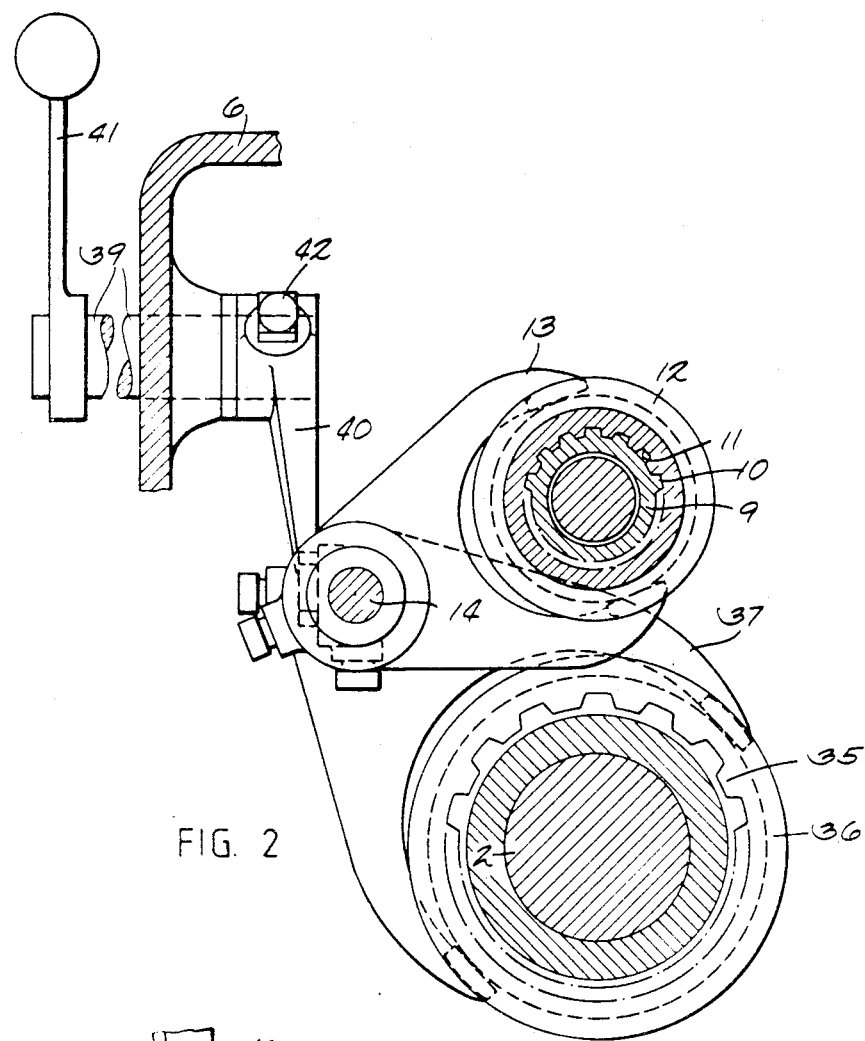
FIG. 2 is illustrates a cross-section view taken along line II—II of FIG. 1 with parts removed for clarity.
Figure 3:
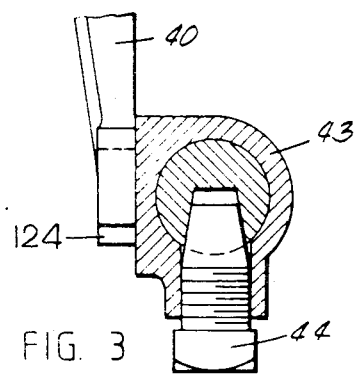
FIG. 3 is a cross-section view taken on line III—III of FIG. 1.

Referring to the drawings, a range transmission 1 selectively drives the propeller shaft 2 and pinion gear 3 which is adapted for driving a ring gear of the differential. A change speed transmission in the form of a planetary drive 4 at the output of the main transmission 5 drives into the range transmission 1. The shift mechanism provides three gear speeds to provide three ranges or multiples of the main transmission 5. The transmission housing 6 carries the bearing assemblies 7 and 8 which rotatably support the quill shaft 9. The quill shaft 9 is coaxial with shaft 122 and is provided with a spline 10 engaging a mating spline 11 on the clutch collar 12. The clutch collar 12 is operated by the shift fork 13 which is carried on the shift rail on rod 14. The clutch collar 12 has spline teeth 15 on the end of the sleeve portion 16 for selectively engaging spline teeth 17 on the planetary carrier 18.

Planetary carrier 18 carries planet gears 19. Planet gears 19 engage the ring gear 20 and the sun gear 21 splined to a sun gear quill shaft 122 of the planetary drive 4. The casing 121 encloses the planetary drive 4 which is at the output of the main transmission and serves to provide two optionally selectable coaxial rotary outputs in the form of the sun gear shaft 122 and the planet carrier 18.

The range transmission 1 includes drive gears 22 and 23. The gears 22 and 23 are formed with internal splines 24 and 25, respectively. These gears engage a mating spline 26 on the quill shaft 9. The gears 22 and 23 are part of gearsets 27 and 28. Gear 22 drives gear 29 of gearset 27 and gear 23 of gearset 28 drives gear 30. Gears 29 and 30 are rotatably mounted on the propeller shaft 2 which is parallel to shaft 9. The propeller shaft 2 forms a spline 31 which receives a mating spline 32 on the clutch sleeve 33. Clutch sleeve 33 has an external spline 34 which engages the internal spline 35 of the clutch collar 36. Clutch collar 36 is operated by the fork 37. Fork 37 is carried on the shift rail 14. The propeller shaft 2 is rotatably mounted on the bearing assemblies 123 and 38 in the housing 6.

The housing 6 carries the shifting mechanism including a bearing which pivotally carries the shaft 39. The shifting arm 40 and the shift lever 41 are integral with the shaft 39. Set screw 42 locks the arm 40 to the shaft 39.

The shift arm 40 pivotally engages a slot 124 in the collar 43. The set screw 44 locks the collar 43 on the shift rail 14.

Figure 6:
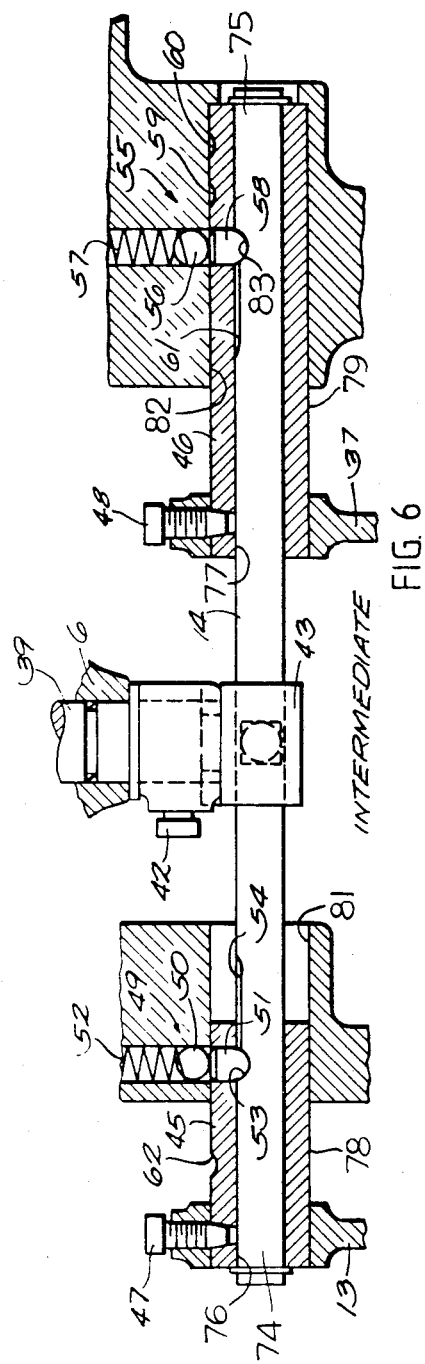
FIG. 6 is a cross-section view of the shifting mechanism in the intermediate position.

Shift rail 14 is formed from a cylindrical rod to present axially spaced cylindrical portions 74, 75 slideably mounted in aligned bores or openings 76, 77 in a pair of aligned sleeves 45 and 46 constituting integral parts of the forks 13 and 37, respectively. Sleeve 45 is integrally fastened with the fork 13 by the set screw 47. The coaxial cylindrical outward facing surfaces 78, 79 of sleeves 45 and 46 are slideably supported in aligned and axially spaced bores 81, 82 in spaced walls of the transmission housing 6. The cylindrical portions 74, 75 of the shift rod 14, the cylindrical surfaces 77, 79 and the cylindrical surfaces defining the bores 76, 77 are coaxial with the cylindrical surfaces defining bores 81, 82 and are parallel to the shafts 2 and 9. Similarly, the sleeve 46 is fastened to the fork 37 by the set screw 48. A detent and interlock mechanism 49 includes a detent element 50 biased to an engaging position with the interlock pin 51 by the spring 52. The detent element can also move to engage recess 62. The interlock pin 51 is shown in FIG. 6 received within the recess 53. The interlock pin 51 is allowed to move in the slot 54 during normal operation which will be subsequently described.

The detent interlock mechanism 55 includes a detent element 56 biased by the spring 57 to an engaging position with the interlock pin 58. The detent element 56 selectively engages the detent recesses 59 and 60 as well. The interlock pin 58 is allowed to move in the slot 61 as will be subsequently described.

Figure 7:
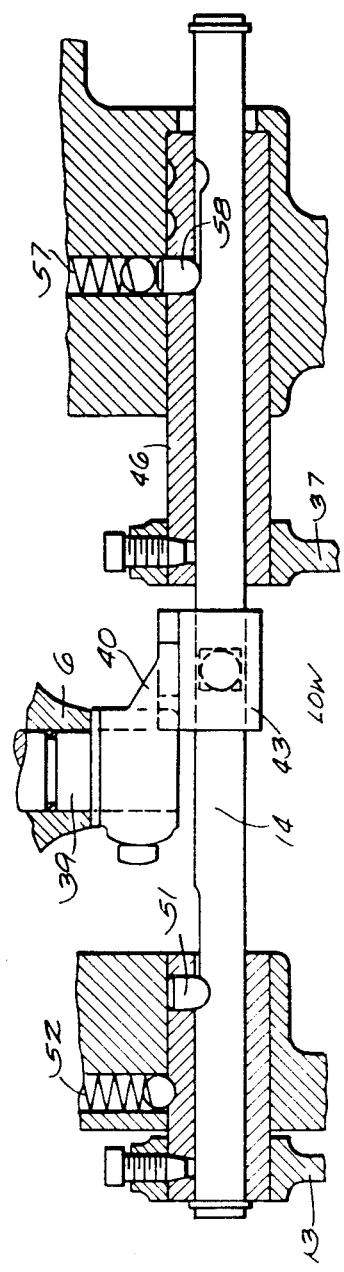
FIG. 7 is a cross-section view of the shifting mechanism showing the low speed gear ratio position.

The operation of the range transmission, shift mechanism and output from the main transmission operate in the following manner. The main transmission 5 is driven by the vehicle engine and drives through the planetary gearset 4 to the range transmission 1 to drive the propeller shafts 2 and a differential to the final drive to drive the vehicle. The main transmission has a plurality of gear shifts to drive the vehicle at various speeds. Preferably, the main transmission is a power shift transmission which can be shifted while the vehicle is moving. The range transmission provides three speeds which in turn multiply the number of speed ratios of the main transmission which would provide fifteen speeds for the vehicle if the main transmission is a five-speed transmission. The speed ratios of the range transmission are indicated in FIG. 1. In the high speed and intermediate speed positions, the planetary gearset 4 is in the direct drive position. In the low speed position, the planetary gearset drives the range transmission from the planetary carrier. For the purpose of illustration, it will be assumed that initially the range transmission is in the low position. In this position, the shift rail is moved to the right by the shift arm 40. This position is shown in FIG. 7 in which the interlock pin 58 is to the left in slot 61 of the shift rail 14. The shift rail is moved to the right and the shift fork 13 is also moved to the right causing the spline teeth 15 of the sleeve 16 of clutch collar 12 to engage the spline teeth 17 of the planetary carrier. The fork 37 is moved right to shift the clutch collar 36 for engagement of the clutch teeth 71 of gear 30. In this position, the planetary gearset 4 is driving through the planetary carrier and the quill shaft 9 drives through gearset 28 to drive the propeller shaft 2.

As the shift lever 41 and shift arm 40 are moved to the intermediate position, clutch collar 12 is moved in the left-hand direction to disengage the planetary carrier from the clutch collar 12. The spline teeth 10 of quill shaft 9 are engaged with the internal spline 11 of clutch collar 12 and as it is moved in the left-hand direction, the spline teeth 11 are engaged with the spline teeth 110 to provide a direct drive from the shaft 122 to quill shaft 9. While clutch collar 12 is thus shifted between its two drive establishing positions the sleeve 46 and fork 37 remain in their corresponding drive establishing positions for drive through the gearset 28 to the propeller shaft 2 although the shift rod moves to the left to bring detent element 58 into engagement with notch 83.

Further movement of the shift lever 41 and shift arm 40 moves the shift rail to the left but allows the shift fork 13 to remain in the same position. Clutch collar 36 moves to the neutral position. Neither gearset 27 nor 28 is in operation. Since detent and interlock mechanism 49 are inoperative to move the shift fork 13, the drive remains in the direct drive position.

Continued movement of the shift lever 41 and shift arm 40 shifts the shift rail 14 and the clutch collar 36 to engage the spline 34 of collar 36 with the clutch teeth 73 of gear 29. This drive establishing position provides drive through the gearset 27 from the quill shaft 9 to the propeller shaft 2. Drive through the planetary gearset 4 is in direct drive in the high speed gear ratio.

Movement of the gear shift lever 41 and shift arm 40 is a pivotal movement but in a single plane from the left-hand position showing the low speed ratio in FIG. 1 to the right-hand position of the high speed ratio. The shift rail 14 reciprocates from the right-hand position to the left-hand position as shown in FIG. 7 to that shown in FIG. 4. The detent and interlock mechanisms selectively engage and disengage the shift rail to move the shift forks to provide the shifting as indicated. When the shift rod 14 is in its low drive ratio position of axial adjustment, as shown in FIG. 7, the detent pin 58 of the detent mechanism 55 locks the sleeve 46 to the housing 6 and the detent pin 51 of the detent mechanism 49 locks the sleeve 45 to the shift rod 14. In this low position, the spring biased detent element or ball 50 engages the notch 62 to releasably detent the shift fork 13 (and the shift rod 14 locked thereto) against axial movement. In the high drive ratio position of adjustment of the shift rod 14, as shown in FIG. 4, the detent pin 58 locks the shift fork 37 to the shift rod 14 and the detent pin 51 locks the shift fork 13 to the housing 6. In this high drive ratio position of adjustment, the detent element or ball 56 is biased by spring 57 into the recess 60 in the sleeve portion 46 of the shift fork 37.

The embodiments of the invention in which an exclusive property or privilege is claimed are defined as follows:

1. In combination with a first change speed transmission mechanism having a pair of coaxial rotary outputs and a second change speed transmission having, a housing, an input shaft coaxial with said rotary outputs, an output shaft and range gearing, a shift mechanism comprising:

a first clutch collar coaxial with the input shaft of said second transmission and axially shiftable between a first position in which said one of said rotary outputs is connected in driving relation to said input shaft and a second position in which the other of said rotary outputs is connected in driving relation to said input shaft, a first shift fork in cooperative engagement with said first clutch collar and including a sleeve mounted on said housing for reciprocating movement in a direction parallel to the axis of said input shaft between first and second positions corresponding to said first and second positions of said first clutch collar, said sleeve presenting a radially inward facing cylindrical surface defining a cylindrical opening whose axis is parallel to said input shaft, a second clutch collar operatively associated with said range gearing and shiftable in a direction parallel to said input shaft to and from a neutral position and first and second clutch engaged positions, a second shift fork in cooperative engagement with said second clutch collar and including a sleeve mounted on said housing for reciprocating movement in said direction parallel to said input shaft between a neutral position and first and second clutch engaged positions corresponding to said neutral, first and second positions of said clutch collar, said sleeve presenting a radially inward facing cylindrical surface defining a cylindrical opening coaxial with said axis of said cylindrical opening of said sleeve of said first shift fork, a shift rod having axially spaced cylindrical portions supported by said surfaces defining said openings of said sleeves and axially shiftable relative to the latter, said shift rod being reciprocatively supported by said sleeves and being axially shiftable relative to said housing between first, second, third and fourth positions of adjustment, a first interlock mechanism operatively associated with said housing, with said sleeve of said first shift fork and with said cylindrical portion of said shift rod disposed within said opening of said sleeve of said first shift fork, and a second interlock mechanism operatively associated with said housing, with said sleeve of said second shift fork and with said cylindrical portion of said shift rod disposed within said opening of said sleeve of said second shift fork, said first interlock mechanism, shift rod and first clutch collar cooperating to cause said first clutch collar to be in its first position when said shift rod is in its first, second and third positions and to cause said first clutch collar to be in its second position when said shift rod is in its fourth position, said second interlock mechanism, shift rod and second clutch collar cooperating to cause said second clutch collar to be in its first clutch engaged position when said shift rod is in its first position, to be in its clutch disengaged position when said shift rod is in its second position of adjustment and to be in its second clutch engaged position when said shift rod is in its third and fourth positions of adjustment.

2. The combination of claim 1 and further comprising a shift control means operatively connected to said shift rod and having a lever movable in a single plane.

3. The combination of claim 1 and further comprising a shift control means for axially shifting said shift rod axially to and from its positions of adjustment including a lever pivotally mounted on said housing for pivotal movement about an axis transverse to the axis of said shift rod.

4. In a transmission having a housing, change speed gearing and a pair of axially shiftable clutch collars each of which is individually shiftable between drive establishing positions of different gear ratios, a pair of aligned bores in said housing, a pair of shift forks operatively engaging said clutch collars, respectively, and having sleeve portions supported, respectively, in said aligned bores in said housing whereby said shift forks are shiftable axially between drive establishing positions corresponding to said drive establishing positions of said collars, said sleeve portions having cylindrical surfaces defining aligned bores, a shift rod presenting cylindrical portions in cooperative axially sliding engagement with said surfaces defining said bores of said sleeve portions and being axially shiftable relative to said housing to at least three drive ratio positions, a first interlock mechanism operatively associated with said housing, with the sleeve portion of one of said shift forks and with one of said cylindrical portions of said shift rod and a second interlock mechanism operatively associated with said housing, with the sleeve portion of the other of said shift forks and with the other of said cylindrical portions of said shift rod, in one of said drive ratio positions of said shift rod one of said shift forks is in one of its drive establishing positions, is locked to said shift rod and is released from said housing and said other shift fork is in one of its drive establishing positions, is locked to said housing and is released from said shift rod, in a second of said drive ratio positions of said shift rod said one shift fork is in the other of its drive establishing positions, is locked to said housing and is released from said shift rod and said other shift fork is in the other of its drive establishing positions, is locked to said shift rod and is released from said housing.

5. The transmission of claim 4 wherein in the third of said drive ratio positions of said shift rod both of said shift forks are released from said housing and releasably locked to said shift rod.

6. The transmission of claim 5 wherein one of said clutch collars and its associated shift fork has a neutral position intermediate its drive establishing positions and wherein said shift rod has a corresponding neutral position of axial adjustment in which said associated shift fork is locked to said shift rod and the other shift fork is locked to said housing.

7. The transmission of claim 4 wherein said shift rod is supported exclusively by said sleeves of said shift forks.

8. The transmission of claim 7 and further comprising a shift control means for operating said shift rod including a lever pivotally mounted on said housing for pivotal movement about an axis transverse to the axis of said shift rod.

9. In a change speed transmission having a housing, a shaft, gears on said shift and a pair of clutch collars, each of which is shiftable axially in relation to said shaft between at least two drive establishing positions, a shift mechanism for said clutch collars comprising:

wall means in said housing defining a pair of aligned and axially spaced mounting bores whose axis is parallel to the axis of said shaft, a pair of shift forks cooperatively engaging said clutch collars, respectively, and presenting sleeve portions in cooperative axially slideable bearing engagement with said bores, respectively, said sleeve portions presenting aligned and radially inward facing cylindrical surfaces, respectively, defining coaxial cylindrical openings, said shift forks being axially shiftable between drive establishing positions corresponding to said drive establishing positions of said shift collars, a shift rod having a pair of axially spaced and aligned cylindrical parts in axially sliding engagement, respectively, with said cylindrical surfaces defining said cylindrical openings in said shift fork sleeve portions, said shift rod being axially shiftable sequentially from a first drive ratio position to second and third drive ratio positions, and an interlock mechanism operatively associated with each of said forks and the housing bore and shift rod portion associated therewith, said interlock mechanisms being operative to lock one of said shift forks to said housing in one of its drive establishing positions and the other of said shift forks to said shift rod when the latter is moved from its first drive ratio position to its second drive ratio position whereby said other shift fork is shifted from one of its drive establishing positions to the other of its drive establishing positions and said interlock mechanisms being operative to lock said other shift fork to said housing when said other shift fork is in its said other drive establishing position and to lock said one shift fork to said shift rod when the latter is moved from its second drive ratio position to its third drive ratio position whereby said one shift fork is shifted from said one drive establishing position to its other drive establishing position.

* * * * *